US012670335B2

(12) United States Patent
Kumaresan et al.

(10) Patent No.: US 12,670,335 B2
(45) Date of Patent: Jun. 30, 2026

(54) CHATBOT SYSTEM FOR STRUCTURED AND UNSTRUCTURED DATA

(71) Applicant: Oracle International Corporation, Redwood Shores, CA (US)

(72) Inventors: Dhileeban Kumaresan, Foster City, CA (US); Sreeji Krishnan Das, Fremont, CA (US); Venktesh Alvenkar, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 146 days.

(21) Appl. No.: 18/645,149

(22) Filed: Apr. 24, 2024

(65) Prior Publication Data
US 2025/0335715 A1     Oct. 30, 2025

(51) Int. Cl.
*G06F 40/35*          (2020.01)
*G06F 16/2452*        (2019.01)
(52) U.S. Cl.
CPC ........ *G06F 40/35* (2020.01); *G06F 16/24522* (2019.01)
(58) Field of Classification Search
CPC ........................... G06F 40/35; G06F 16/24522
See application file for complete search history.

(56) References Cited

U.S. PATENT DOCUMENTS

| | | | |
|---|---|---|---|
| 2012/0151272 A1* | 6/2012 | Behrendt | G06F 11/203 |
| | | | 714/39 |
| 2015/0220605 A1* | 8/2015 | Syed | G06F 17/40 |
| | | | 707/776 |
| 2018/0285418 A1* | 10/2018 | Petropoulos | G06F 16/3332 |
| 2022/0277143 A1* | 9/2022 | Jayarao | G06N 20/00 |
| 2024/0338361 A1* | 10/2024 | Hazel | G06F 16/2423 |
| 2025/0156483 A1* | 5/2025 | Lecroart | G06F 16/2379 |
| 2025/0173330 A1* | 5/2025 | Durg | G06F 16/243 |
| 2025/0173519 A1* | 5/2025 | Chiang | G06F 16/383 |

OTHER PUBLICATIONS

"Microsoft Research Sequential Question Answering (SQA) Dataset", Retrieved from https://www.microsoft.com/en-us/download/details.aspx?id=54253, Nov. 11, 2016, pp. 3.

(Continued)

*Primary Examiner* — Sonia L Gay
(74) *Attorney, Agent, or Firm* — Invoke

(57) ABSTRACT

Techniques for operating a chatbot system for enterprise-level conversational agents are disclosed. These techniques are performed by an application or cloud service executing on one or more computing devices. An enterprise system can deploy conversational agents onto user devices to run as chat interfaces for logging analytics question-answering. One example application or cloud service may be a multi-model chat mechanism configured to support these chat interfaces with backend functionality. In response to an incoming question, the chat mechanism first consolidates the question with any conversation history and then, classifies the user's question as either a question regarding unstructured document data, a question regarding structured log data, or a hybrid question. Based on the classification, the chat mechanism can generate a proper large language model (LLM) response.

20 Claims, 8 Drawing Sheets

(56) References Cited

OTHER PUBLICATIONS

"T5", Retrieved from https://huggingface.co/docs/transformers/model_doc/t5, Jun. 7, 2024, pp. 61.

"TAPAS base model fine-tuned on Sequential Question Answering (SQA)", Retrieved on https://huggingface.co/google/tapas-base-finetuned-sqa, Jan. 18, pp. 8.

Chung et al., "Scaling Instruction-Finetuned Language Models", Dec. 6, 2022, pp. 5.

Herzig et al., "TAPAS: Weakly Supervised Table Parsing via Pre-training", Apr. 21, 2020, pp. 5.

Sanh et al., "DistilBERT, a distilled version of BERT:smaller, faster, cheaper and lighter", Mar. 1, 2020, pp. 5.

Wang et al., "Text Embeddings by Weakly-Supervised Contrastive Pre-training", Feb. 22, 2024, pp. 5.

* cited by examiner

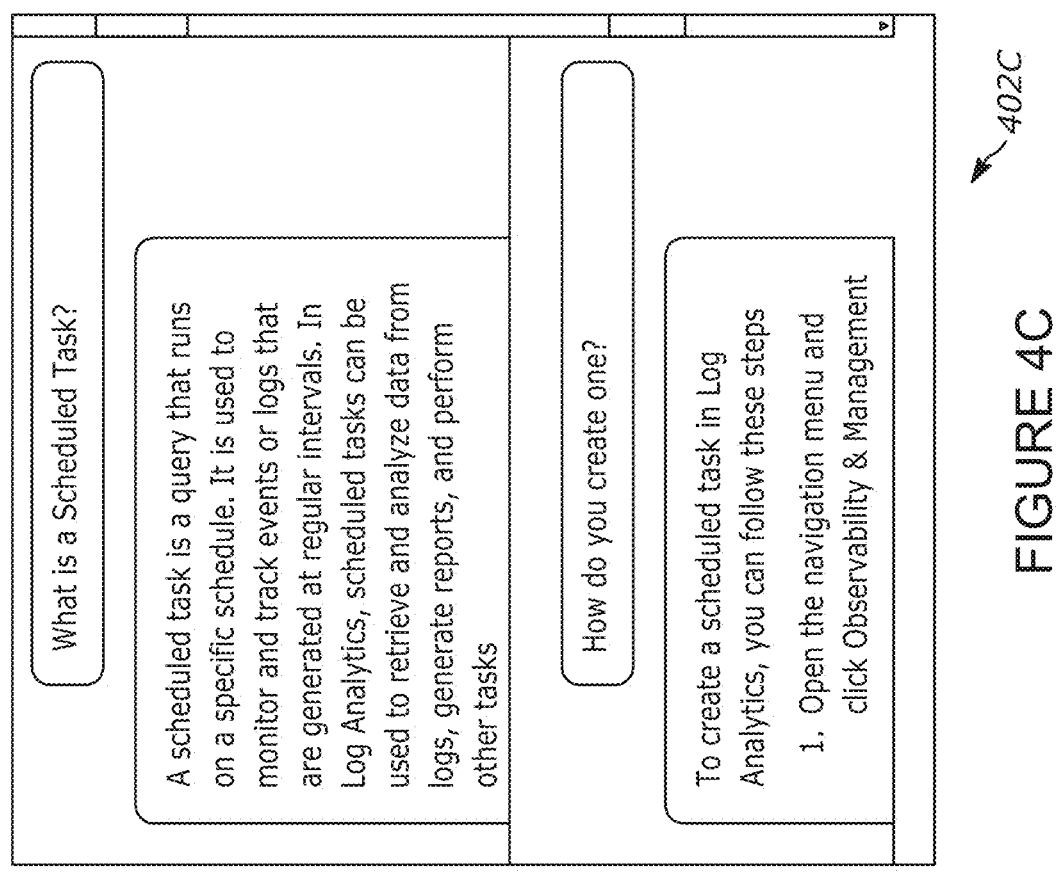

What is a Scheduled Task?

A scheduled task is a query that runs on a specific schedule. It is used to monitor and track events or logs that are generated at regular intervals. In Log Analytics, scheduled tasks can be used to retrieve and analyze data from logs, generate reports, and perform other tasks How do you create one?

To create a scheduled task in Log Analytics, you can follow these steps

1. Open the navigation menu and click Observability & Management

CHATBOT SYSTEM FOR STRUCTURED AND UNSTRUCTURED DATA

TECHNICAL FIELD

The present disclosure relates to computing technologies. In particular, the present disclosure relates to a chatbot system for answering natural language questions with answers from non-tabular and/or tabular data sources.

BACKGROUND

Software products often interact with their users through conversational agents known as chatbots because these agents can simulate (to a certain degree) a human agent who is ready to provide assistance. Chat interfaces generally are graphical user interfaces (GUIs) that allow a user to enter their questions regarding a software product and obtain answers without having to find an actual human agent. Chat interfaces may be powered by a backend chat mechanism that is configured to generate the answers for the user questions through a variety of technologies (e.g., informational databases, search engines, and/or the like). With the growth in generative artificial intelligence (AI) technologies, today's chat interfaces have become fairly accurate in making sense of user questions even when provided in their own natural language. For at least that reason, chat interfaces have become ubiquitous in computing technologies and can be found in applications and services ranging from desktop/mobile and Internet applications to enterprise systems and cloud computing services.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 4A-4E illustrate example question and answer sessions between a user and a chatbot system in accordance with one or more embodiments.

DETAILED DESCRIPTION

Figure 1:
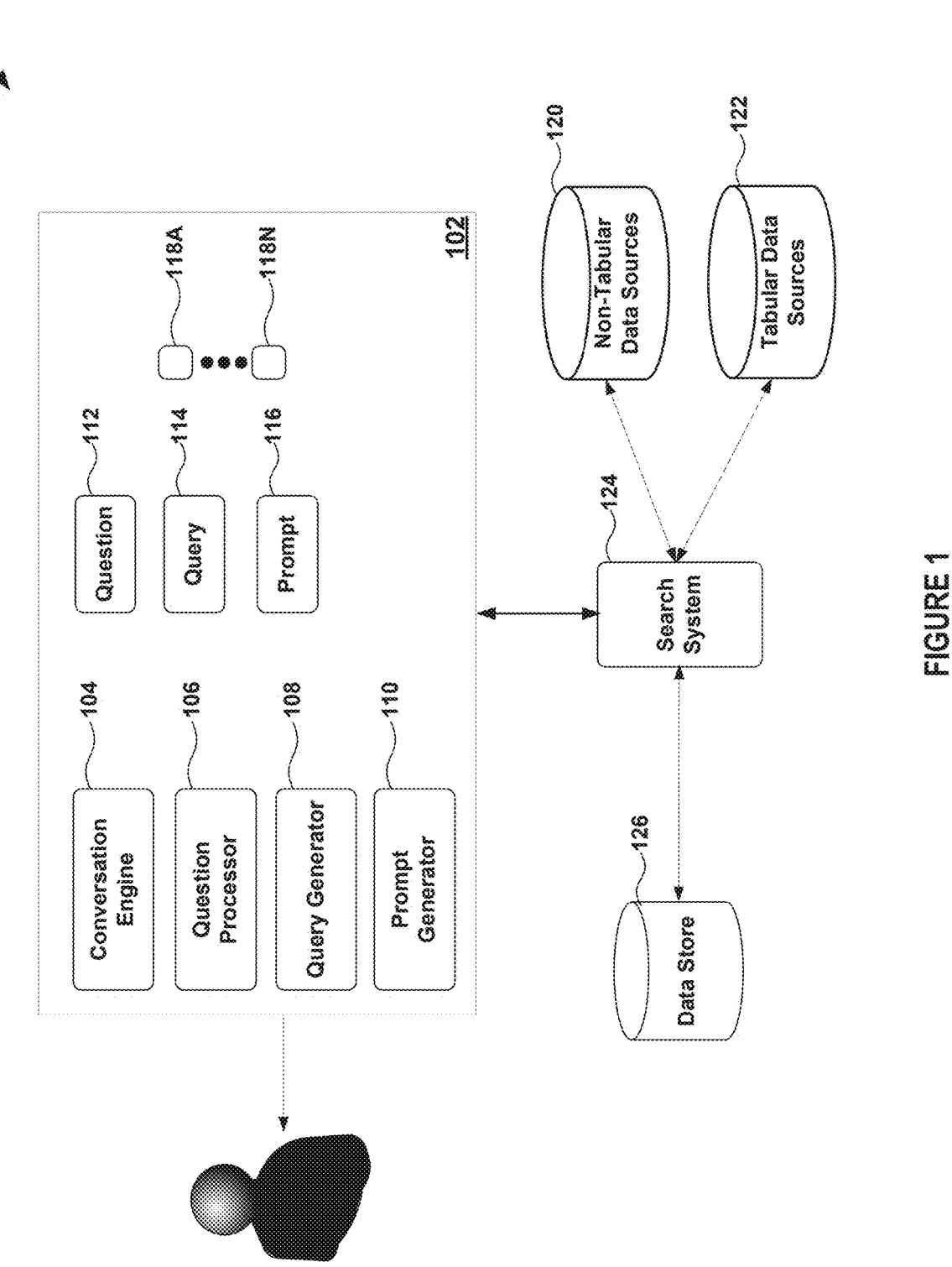
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CHATBOT SYSTEM
   a. COMPONENTS
3. QUESTION-ANSWERING FOR TABULAR DATA, NON-TABULAR DATA, OR BOTH TABULAR DATA AND NON-TABULAR DATA
4. EXAMPLE EMBODIMENT
5. COMPUTER NETWORKS AND CLOUD NETWORKS
6. MICROSERVICE APPLICATIONS
7. HARDWARE OVERVIEW
8. MISCELLANEOUS; EXTENSIONS

1. General Overview

One or more embodiments of a chatbot system include a chat mechanism that operates a backend framework for a frontend chat interface through which users can submit natural language questions and have their questions answered with tabular data (i.e., structured data, such as log data), non-tabular data (i.e., unstructured data, such as document data), or both tabular and non-tabular data. To accomplish such functionality, the chat mechanism may invoke a semantic parsing model such that, whenever a user submits a question, the semantic parsing model can accurately determine the user's intent behind submitting their question. If the user's intent is to have various non-tabular data sources searched for an answer to their question, the chat mechanism retrieves relevant data from those data sources and generate the desired answer by using the retrieved data as context when invoking a large language model (LLM). On the other hand, the user's intent may be to have certain tabular data sources searched in a manner similar to that of a structured query. To that end, the chat mechanism may employ a query language generator model to convert the user's question into the structured query. It is possible for the user to intend on having both the tabular and non-tabular data sources searched for an answer to their question in which case the chat mechanism performs both of the above-mentioned operations.

One or more embodiments described in this Specification and/or recited in the claims may not be included in this General Overview section.

2. Chatbot System

The present disclosure describes a chatbot system that generally includes a programmed backend framework for processing natural language questions and generating relevant responses for visualization on a front-end chat interface. The chatbot system leverages a number of technological improvements into configuring a chat mechanism to convert the natural language questions into Large Language Model (LLM) prompts and/or structured queries that when evaluated, produce the above-mentioned answers. Because the chatbot system generates these LLM prompts and/or structured queries to have a similar or equivalent semantic interpretation to the original questions, evaluating such LLM prompts and/or structured queries results in LLM responses and/or query results with relevant data that is retrieved from non-tabular data and/or tabular data sources.

It should be noted that the chatbot system as described herein may be applicable to logging analytics for an enterprise system but is not limited in any way to such an environment. It should further be noted that the chatbot system as described herein is multi-model in structure, employing various machine learning models (e.g., natural language processing models), yet some embodiments can employ a single semantic parsing model and only perform the classification of user questions (e.g., into document search terms or log data queries). For these embodiments, models used in the multi-model chatbot system (e.g., query generation model) are accessible as services in a manner similar to a commercially available LLM service.

FIG. 1 illustrates a system 100 in accordance with one or more embodiments. As illustrated in FIG. 1, system 100 includes chat mechanism 102, which also may be known as a chatbot; therefore, system 100 may be referred to as a chatbot system. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

The chat mechanism 102 generally represents an application or service running in one or more computing devices that, when combined with a frontend user interface (known as a chat interface), forms (at least part of) the chatbot system 100. Additionally, or alternatively, the chat interface may be implemented or executed on a computing system separate from the chat mechanism 102 (e.g., on a user device). For instance, the one or more computing devices may be communicatively coupled to the user device via a direct connection or via a network.

The chat mechanism 102 is communicatively coupled with non-tabular data sources 120 and tabular data sources 122 via a search system 124. The non-tabular data sources generally include documents of unstructured data (e.g., documentation, HTML pages, confluence pages, ADDM reports, and/or the like) from any source (e.g., technical knowledge bases). The tabular data sources 122 generally include tables of structured data (e.g., logs and log reports) from any source.

In one or more embodiments, the search system 124 includes a search engine capable of searching one of or both the non-tabular data sources 120 and tabular data sources 122. The search engine may be configured to evaluate search terms (e.g., keywords) against the non-tabular data sources 120. In one or more embodiments, the search system 124 also includes a query engine capable of evaluating structured queries against the tabular data sources 122. In some embodiments, the search system 124 includes a query engine that can be built on a proprietary query language and/or a custom query language. The search system 124 can add/remove table field names (e.g., log field names) to/from the fine-tuning training data for any of the above-mentioned examples of the models 118, including the semantic parsing model and/or the query language generator model, if needed.

One or more embodiments of the chat mechanism 102 are configured to generate suitable answers for questions regarding tabular data and/or non-tabular data that are submitted by users via the chat interface. There are a number of ways for the chat mechanism 102 to accomplish such an improvement to chatbot systems in general, for example, by implementing a number of natural language processing techniques and machine learning models into at least some components of the chat mechanism, as explained in detail further below.

A. Components

As depicted in FIG. 1, the chat mechanism 102 includes a number of components in its configuration, such as a conversation engine 104, a question processor 106, a query generator 108, and a prompt generator 110. Each component includes executable logic (e.g., processor-executable instructions or code) for performing one or more computerized operations. Some components may be dedicated to specific functionality, such as the execution of a machine learning algorithm. The conversation engine 104 can be configured to maintain a conversation with a chat user and generally manage the input and output of various content (including, but not limited to, text, charts and other graphical views, audio, video, and/or the like) between a chat user and the chat mechanism 102.

When the conversation engine 104 receives a natural language question 112 in user input, the chat mechanism 102 orchestrates one or more other components to generate a valid response. One example valid response may include a suitable answer to a question or a remark of "I don't know" if no suitable answer can be determined. One or more embodiments maintain a conversation state for the question 112 by summarizing the preceding conversation and consolidating that summary with the user's question 112. The conversation engine 104 can implement one of a number of summarization techniques to generate the summary as explained further below. Typically, a user engages in a conversation with the frontend chat interface while asking a number of natural language questions, and a commercially available LLM would return an answer for each question without putting it in the proper context of the entire conversation. By maintaining the conversation state of the question 112 in the summary, the chat mechanism 102 can provide a more suitable answer in response (e.g., the chat mechanism may infer intent to access tabular or non-tabular data).

One or more embodiments of the chat mechanism 102 invoke the question processor 106 to determine whether to answer the question 112 by having the query generator 108 generate a structured query 114 and/or the prompt generator 110 generate a prompt 116. In one embodiment, the question processor 106 invokes a semantic parsing model to perform the above determination. If the question processor 106 determines that the question 112 indicates a search of the non-tabular data sources 120, the prompt generator 110 can parse and transform the question 112 into the prompt 116 from which machine learning model(s) 118 (e.g., a question-answering LLM) can provide a suitable answer to the question 112. If, on the other hand, the question processor 106 determines that the question 112 indicates a search of the tabular data sources 122, the chat mechanism 102 instructs the query generator 108 to parse and transform the question 112 into the structured query 114 using the machine learning model(s) 118 (e.g., one or more LLMs). In turn, the conversation engine 104 may generate, for output to the chat interface, appropriate content indicating a textual representation of the structured query 114 and/or a response (e.g., LLM response) to the prompt 116. The appropriate content may include charts and other visualizations of query results or relevant document data. In one example, the conversation engine 104 may couple the structured query 114 with a link that, when activated, causes an evaluation of the structured query 114 against the tabular data sources 122.

As explained herein, the conversation engine 104, the question processor 106, the query generator 108, and/or the prompt generator 110 may avail any number of machine learning models 118A-118N (hereinafter referred to as models 118) to effectuate the above. In one embodiment, the conversation engine 104 of the chat mechanism 102 may invoke a pre-trained LLM capable of answering questions in natural language text and then, apply the pre-trained LLM to the LLM prompt 116, which generates a LLM response. For some embodiments, the chatbot system 100 can be configured to replace the Retrieval Augmented Generation (RAG) functionality used in the pre-trained LLM, for example, by instrumenting the search system 124 for a semantic search function and building a ground truth in a particular category of information. By doing so, the chat mechanism 102 can use the pre-trained LLM to accurately answer questions and solve tasks using specific data sources as the source of truth. As described herein, there is a need for insight into logging analytics and some embodiments may focus the ground truth on logs and other logging data in addition to documentation on logging analytics. To reduce costs and save resources, the pre-trained LLM is not fine-tuned and can be limited to question-answering tasks.

The components of the chat mechanism 102 may leverage one or more machine learning cloud services including, but not limited to, commercially available LLM services. Some LLM services enable access to pre-trained models (which are hereinafter referred to simply as pre-trained LLMs) for a specific natural language processing task (e.g., text generation, summarization, semantic parsing, classification, and/or the like), such as a Generative Pre-trained Transformer (GPT) from OpenAIR (e.g., ChatGPT™), Cohere®, or another provider. Some components of the chat mechanism 102 implement the pre-trained LLMs using techniques that enhance their functionality, benefiting the chatbot system 100 in a number of ways, for instance, with improved search capabilities such as in semantic search, increased task granularity, and/or more accurate task solutions.

Some LLM services provide pre-trained LLMs for a specific natural language processing task, and those pre-trained LLMs can be fine-tuned to focus on a particular subset of the task problem. Fine-tuning generally refers to a machine learning technique that iteratively trains a pre-trained target model f to better map a set of input variables to an output variable. The chat mechanism 102 (or another component of the chatbot system 100) can be configured to fine-tune a pre-trained LLM using fine-tuned training data. The pre-trained target model f can be fine-tuned such that when the fine-tuned target model f is applied to the specific datasets (e.g., log sources) of the fine-tuned training data, a maximum number of results determined by the fine-tuned target model f matches the labels of those datasets.

Some embodiments of the chatbot system 100 avail various LLM services to implement and fine-tune commercially available LLMs into an architecture (e.g., a microservice architecture with a REST API) for solving specific language processing problems. An example architecture includes multiple LLMs—such as a semantic parsing model, a query language generating model, a natural language question-answering model, and/or the like—as at least some of the models 118.

HuggingFace® DistilBERT™ is one example of a transformer model that is first pre-trained for natural language classification (e.g., semantic parsing) and then fine-tuned into the semantic parsing model according to some embodiments. The classification task of "semantic parsing" generally denotes extracting a precise meaning of a natural language utterance and then, converting the utterance into a logical form, which may be a machine-readable representation of the utterance's meaning. The semantic parsing model may result from fine-tuning the DistilBERT™ transformer model for a classification task of differentiating between at least two question types (and/or a hybrid type). In some embodiments, the question processor 106 identifies a first question type when an application of the semantic parsing model determines that the question 112 maps to document keyword metadata and therefore, indicates a search of the non-tabular data sources 120. In some embodiments, the question processor 106 identifies a second question type when an application of the semantic parsing model determines that the question 112 maps to table field metadata and therefore, indicates a search of the tabular data sources 122. In one embodiment, the semantic parsing model can be fine-tuned into a classifier that, when combined with a multi-step orchestrator, is operative to distinguish between questions related to logging analytics documentation (e.g., reports and/or charts), questions related to logs and/or a logging analytics query language (e.g., Oracle® Logging Query Language queries), and any hybrid combination thereof.

Google® Flan-T5 is one example of a pre-trained LLM that can be fine-tuned into a query language generating model according to one or more embodiments. The pre-trained Flat-T5 LLM may be fine-tuned with text2ql (text-to-query language) tasks, including chain-of-thought reasoning, to solve a query writing problem with a step-by-step solution. Flan-T5 is itself the instruction fine-tuned version of T5 or Text-to-Text Transfer Transformer Language Model. Flan-T5 can be further fine-tuned using field metadata for a specific (e.g., custom) query language, which is particularly useful with questions that require the query language generating model to have deep domain expertise such as for logging analytics query language queries. To that end, some embodiments combine Flan-T5 with another commercially available LLM to achieve more efficient code generation (e.g., query language generation).

Google® TAPAS is one example of a pre-trained LLM for question-answering tasks on tabular data. TAPAS can be pre-trained on a masked language modeling (MLM) objective and then, fine-tuned on data tables (e.g., log tables) in the tabular data sources 122. Some example data tables comprise of field names with a description and sample values for low cardinality. The task of TAPAS is to select the appropriate field(s) for query generation given the meaning and user's intent behind the question 112. According to one embodiment, the query language generating model includes a model structure combining TAPAS with Flan-T5.

As explained further below, one or more embodiments of the search system 124 and the data store 126 can be a combined search engine and peta-byte scale text storage system. The search system 124 populates the data store 126 from an ingest (e.g., REST API Ingestion) of both tabular and non-tabular data sources, such as log files, object storage files, database tables, and/or confluence pages. The search system 124 can support natural language searches of the non-tabular data sources 120 and custom query language (structured) queries of the tabular data sources 122. The custom query language may be specific to logging analytics (e.g., a logging analytics query language) and/or based on a ANother Tool for Language Recognition (ANTLR) base grammar. The query language can be combined with the data store 126 to scale the search system 124 to billions of documents.

The search system 124 can also leverage one or more of the models 118 to support the chat mechanism 102. One embodiment uses an embedding model to represent, in a vector space, relationships between words or phrases. The search system 124 can ingest text from both non-tabular and tabular data sources 120, 122 and convert the words and/or phrases into continuous-valued vectors whose semantic similarity can be represented by how close they are to each other in vector space. These embeddings, which may be stored in a data store 126, enable semantic search functionality for the search system 124. One example embedding model may be E5 which stands for "EmbEddings from bidirectional Encoder rEpresentations." By converting the question 112 into E5 embeddings, the search system 124 can retrieve document fragments that have a pre-requisite degree of semantic similarity, and the prompt generator 110, in turn, can generate a RAG pattern from retrieved document fragments for the LLM prompt 116. As explained in detail further below, using the RAG pattern as context for the question 112 results in a helpful answer.

In one or more embodiments, a data store 126 is any type of storage unit and/or device (e.g., a file system, database, collection of tables, or any other storage mechanism) for storing data. Further, a data store 126 may include multiple different storage units and/or devices. The multiple different storage units and/or devices may or may not be of the same type or located at the same physical site. Further, a data store 126 may be implemented or executed on the same computing system as the chat mechanism 102.

The chat mechanism 102 can leverage a data store 126 that combines logs and log reports with documentation, which often contains unstructured text, charts, and/or the like. Having a single data store 126 enables a hybrid mode of operation, which is when the user's question elicits both a tabular data search (e.g., query) and a non-tabular data search, according to one or more embodiments.

In one or more embodiments, the chat mechanism 102 of the chatbot system 100 refers to hardware and/or software configured to perform operations described herein for generating, for visualization on a frontend chat interface, relevant responses for chat users' natural language questions regarding non-tabular (i.e., unstructured) datasets and/or tabular datasets. Examples of operations for generating relevant responses for users' natural language questions regarding non-tabular (i.e., unstructured) datasets and/or tabular datasets are described below with reference to FIG. 2.

In an embodiment, the chat mechanism 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, the frontend user interface (or chat interface) refers to hardware and/or software configured to facilitate communications between the user (e.g., of an enterprise system) and the chat mechanism. The chat interface renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the chat interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the chat interface is specified in one or more other languages, such as Java, C, or C++.

Figure 2:
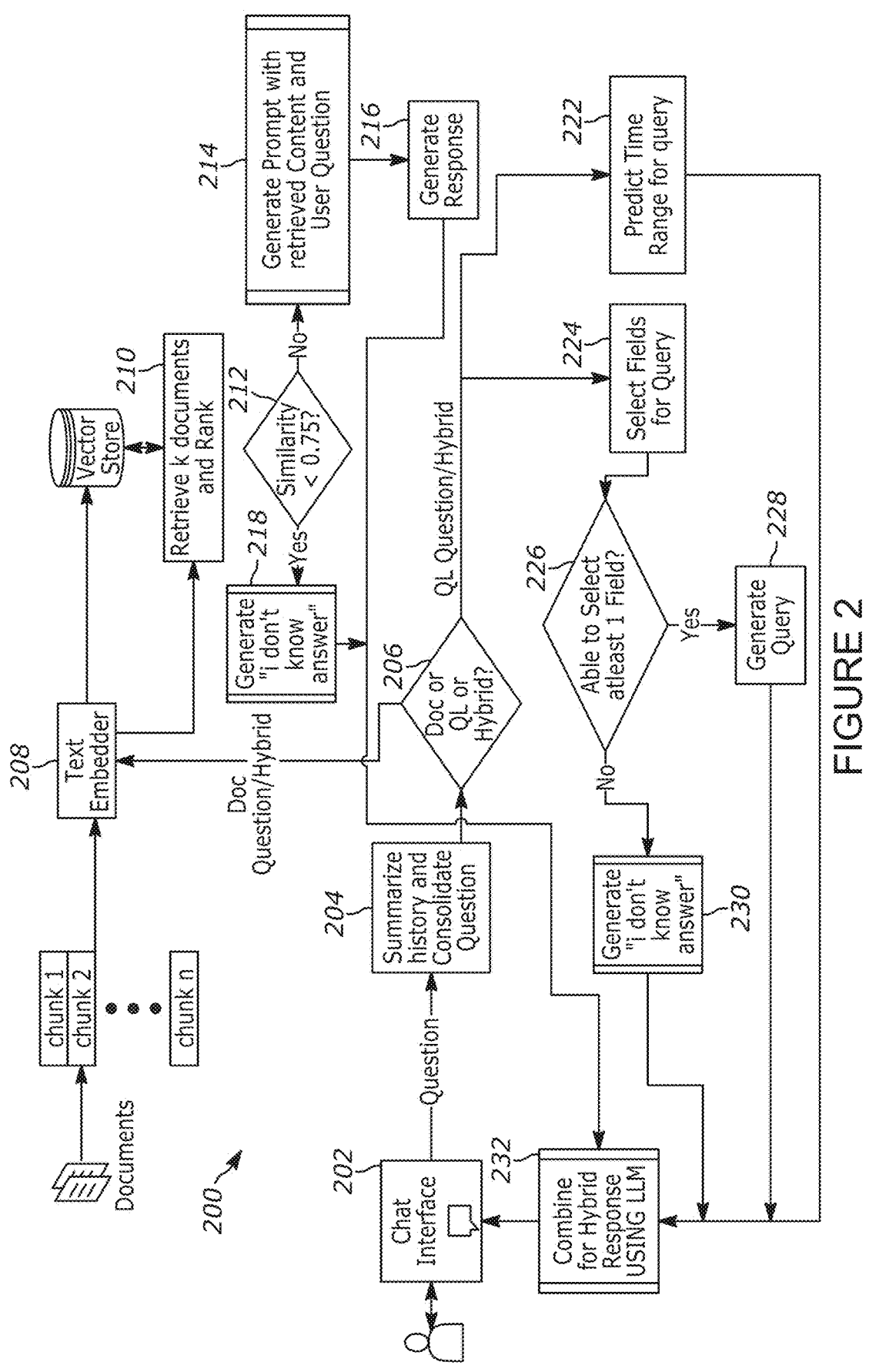
FIG. 2 illustrates an example set of operations for a chatbot system in accordance with one or more embodiments.

3. Question-Answering for Tabular Data, Non-Tabular Data, or Both Tabular Data and Non-Tabular Data FIG. 2 illustrates an example set of operations for in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

The following describes a system, such as the chatbot system described for FIG. 1, for executing the particular sequence of operations. In some embodiments of the system, a backend framework implements a model architecture in which different LLMs are being used for tabular queries and non-tabular searches. The backend framework coordinates the application of these LLMs when processing natural language questions and generating relevant responses for visualization on a frontend user interface.

In an embodiment, the system obtains user input that is conversational in nature (Operation 202). The system may be an enterprise system that operates a conversational agent that is configured to interact with the user through a chat interface on a user device. Repeated interactions between the user and the system may result in a conversation. One example interaction includes the user entering a textual description of an issue/problem and then, positing a question for the system to answer. In response, the system may return a helpful answer for the chat interface to present to the user. Some embodiments of the system also return various content for visualization on the chat interface, including text, charts, audio/video, and/or the like. The user may conclude the example interaction upon receiving the helpful answer or, alternatively, may choose to continue the conversation by entering another description and question.

In an embodiment, the system identifies a natural language question in the user input and proceeds to summarize the conversation history and consolidate the question (Operation 204). There are a number of ways to identify a question from incoming text, such as by identifying a "question" mark punctuation character. The system may, upon identifying a question mark, convert the user's entire conversation history into a consolidated question that is conversationally aware. To maintain a conversation state and provide sufficient context for each question, the system uses a commercially available LLM to first summarize the user's conversation history with the front-end chat interface and then consolidate that summary with the user's question to generate a consolidated question. One advantage for having a conversationally aware question is avoiding any limitations on input size (e.g., context tokens). LLM services may enforce a size limit on any context provided with the question, which in many cases prevents LLM service users from submitting the conversation history along with the question in a single prompt; without sufficient context, the LLM services could misinterpret the user's question.

In an embodiment, the system determines whether to classify the consolidated question as a document ("Doc") question, a query language ("QL") question, or a hybrid ("Hybrid") question (Operation 206). A Doc question is one whose answer includes relevant passages, charts, and other content from documentation and related non-tabular data sources. On the other hand, a QL question is an example of a question whose answer includes a search for relevant table data from logs and other tabular data sources. In some embodiments, an example Hybrid question is one whose answer includes both relevant passages and relevant table data.

The system can identify, in the user input, an example document question, an example query language question, or an example hybrid question based on an application of a semantic parsing model to the consolidated question. For example, given the user input "What is the name of the target you need to specify when settings up the service connector?" as the natural language question, the system may invoke a semantic parsing model, which results in classifying the natural language question as an example Doc question. As another example, given user input "Is 153.58.1114.76 a Public IP?" as a natural language question, the application of the semantic parsing model by the system may classify the question as an example QL question. It should be noted that some embodiments fine-tune the semantic parsing model to distinguish between user questions that are more like tabular (e.g., log data) queries and questions that are more like non-tabular (e.g., document data) searches. The system can train a commercially available LLM to classify a user's question as one whose proper response should come from non-tabular data sources (e.g., documentation and reports), from tabular data sources, or from both. In other words, the semantic parsing model is not pre-trained to determine whether a proper response requires a semantic search of the non-tabular data sources (e.g., documentation and reports) for RAG patterns and/or a structured search of the tabular data sources by way of a structured query (e.g., a log data query).

To illustrate by way of example, when at least a portion of the consolidated question maps to document keyword metadata that can be found in various documentation, an application of the semantic parsing model may determine that the question indicates a search of the non-tabular data sources (for relevant document data). On the other hand, when at least a portion of the consolidated question maps to table field metadata found in various logs, an application of the semantic parsing model may determine that the question indicates a search of the tabular data sources (for relevant log data). The system can also identify, in the user input, an example hybrid question when an application of the semantic parsing model determines that the question maps to both types of searches. In some embodiments, the query language question may be alternatively referred to as a log or log data question if the question specifies log data sources.

In some embodiments, based on the application of the semantic parsing model to the consolidated question, the system determines that the consolidated question indicates a search of non-tabular data sources and therefore, proceeds to Operation 208 because the consolidated question is an example document question. In some embodiments, based on the application of the semantic parsing model to the consolidated question, the system determines that the consolidated question indicates a search of tabular data sources and therefore, proceeds to Operation 222 because the consolidated question is an example query language question. If the system determines that the consolidated question is an example hybrid question, the system proceeds to Operation 222 after completing Operation 220.

In an embodiment, the system generates, from the consolidated question, vector embeddings for later comparison with keyword metadata and/or field metadata associated with the non-tabular and/or tabular data sources (Operation 208). These embeddings are later used in a RAG solution for answering document questions as explained further below. It should be noted that Operation 208 may involve a pre-processing step where the system populates a data store with vectors (e.g., document vectors) that map to document keyword metadata and/or table field metadata. Therefore, the system can build, from the document vector embeddings, a machine learning model (e.g., a LLM) for searching documentation for a specific topic or a grouping of topics.

In some embodiments, the system generates a semantic search model from vector embeddings that are generated from Logging Analytics (LA) documents, log records, and/or other corpus. In some embodiments, the system configures a search engine with the semantic search model to enable a semantic search of the above documents, log records, and/or other corpus associated with LA. As described herein, "semantic search" refers to a search with an understanding of the overall meaning of a search request, as distinguished from lexical search where a search engine looks for literal matches of any search term(s) (including any variants). Semantic search engines, therefore, feature a more holistic approach to documentation searches by focusing on matching document contents with the whole meaning of the search request's terms and the context of those terms within the document contents.

In an embodiment, the system retrieves and ranks k documents from the semantic search model (Operation 210). In one embodiment, the system retrieves k documents that are the closest in semantically similarity to the consolidated question. The above-mentioned vector data store allows the system to rank these k documents according to their semantic similarity and then, accurately determine whether to generate an answer or generate a response indicating that no answer has been found.

In an embodiment, the system determines whether the retrieved k documents, when compared with the consolidated question, are within a threshold of semantic similarity (Operation 212). If the k documents fail to satisfy the threshold of semantic similarity, these documents cannot be used as context, and a suitable answer most likely cannot be generated. This is because an LLM might produce a response that is irrelevant and/or incorrect if the prompt fails to describe a possible answer to the consolidated question.

In an embodiment, the system generates a prompt (Operation 214). The prompt as described herein refers to a LLM prompt that is generated using retrieved data and the user's consolidated question. One embodiment may combine the consolidated question with one or more RAG patterns, which are fragments of retrieved data from semantically similar documents and/or tables. These fragments may be document fragments having keywords that also are identified in the consolidated question. In one embodiment, the retrieved data may include content from the retrieved k documents.

In an embodiment, the system generates a response (e.g., LLM response) (Operation 216). The LLM response is generated by way of an application of the LLM to the LLM prompt. The system generates, for visualization on the chat interface, computerized output comprising the LLM response and possibly other content for presenting the answer to the user's question. The user's intent also enables the system to identify a proper visualization for the response.

In an embodiment, the system generates "I don't know answer" as at least part of a response to the user (Operation 218). The system may generate such a response if an insufficient number of semantically similar documents is available for use as LLM context.

If the consolidated question is a query language (QL) question or a hybrid question, the system proceeds to predict a time range for query evaluation against the tabular data (Operation 222). In some embodiments, the system may use any machine learning model capable of classifying text based on a likely time range. This model may be a trained Bayesian classifier. Alternatively, the system may utilize any commercially available pre-trained LLM to avoid training another model.

In an embodiment, the system selects fields for building a structured query for evaluation against the tabular data (Operation 224). In some embodiments, the system may use a fine-tuned query language generating model configured for question-answering tasks on tabular data. Fine-tuning may involve training this model to identify specific query language fields (e.g., LoqQL or LQL fields). Building such queries require the query language generating model to have deep domain knowledge of the right schema (e.g., Virtual Cloud Network (VCN) Flow Logs=Subnet, Network, Private IP, Rejected Packets, City names, and so forth). The specific query language fields may vary from implementation to implementation depending on the specific query language used for evaluation against the tabular data. Another example query language is structured query language (SQL), which includes commands for fetching and manipulating structured data (e.g., data stored in relational database tables).

In an embodiment, the system determines whether the query language generating model selected at least one field for the structured query (Operation 226). Part of the query generation may involve parsing and validating the structured query according to the corresponding query language. After parsing the consolidated question into tokens, the system generates the structured query from field names (e.g., log field names) that also are identified in the consolidated question. Based on the application of the query language generating model to the consolidated question, the system determines whether to generate the structured query (Operation 228) or "I don't know answer" as a suitable response for visualization (Operation 230). Understanding the user's intent allows the system to provide a more appropriate response, for instance, by narrowing a search space to specific fields of tabular data sources and searching for relevant documents and logs.

In an embodiment, the system identifies at least one field in the consolidated question based on an application of the query language generator model and proceeds to generate the structured query (Operation 228). Instead of or prior to evaluating the structured query, the system may generate computerized output for visualization on the user interface comprising a textual representation of the structured query.

Upon user request, the system generates a summary of query evaluation results. In addition to these query evaluation results, the system may generate charts, graphs, video/audio presentations, and dashboards based on the structured query.

In an embodiment, the system fails to identify at least one field in the consolidated question and therefore, generates "I don't know answer" for presentation to the user (Operation 230).

Figure 3:
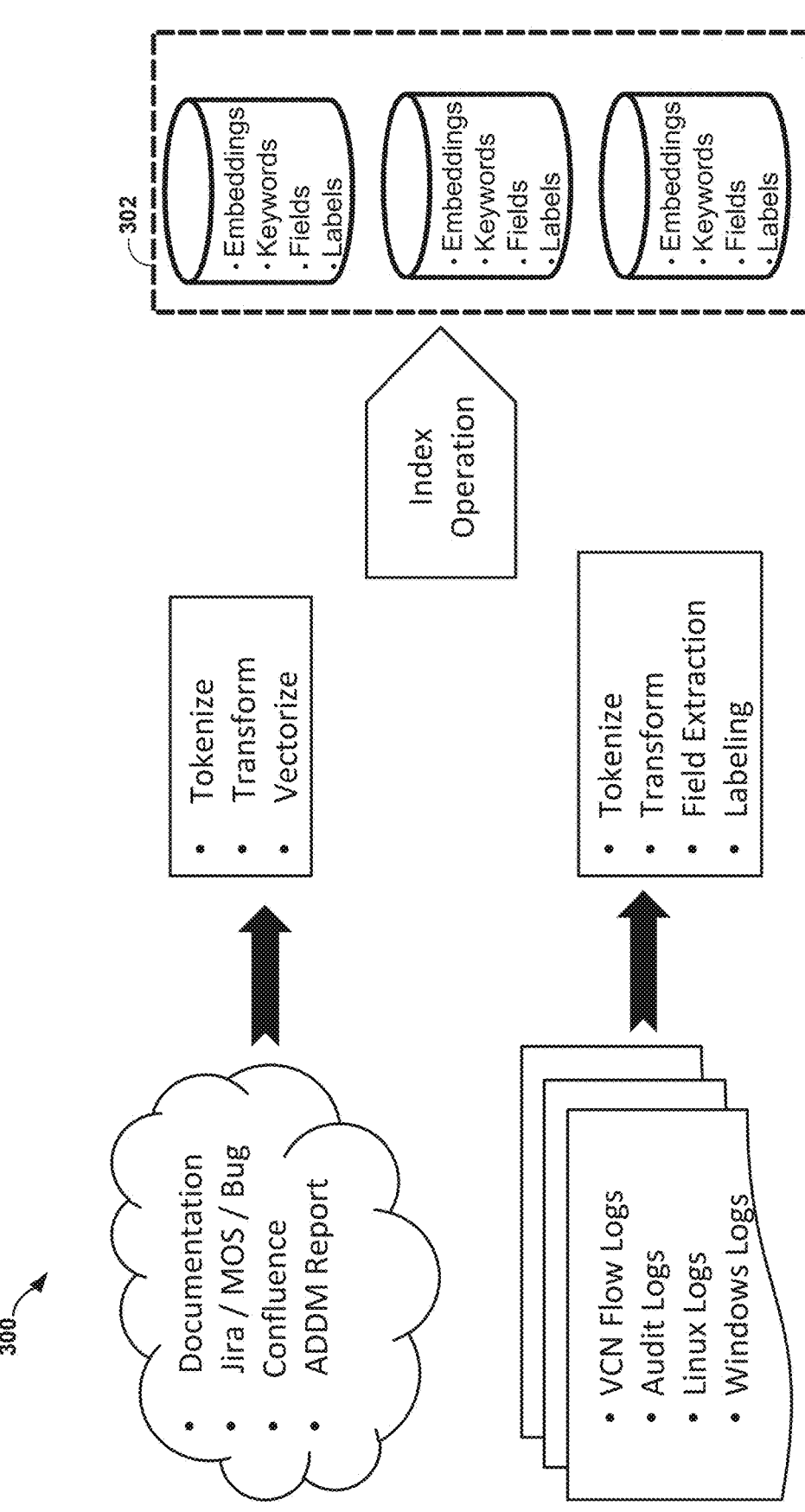
FIG. 3 illustrates an example search system and data store for a chatbot system in accordance with one or more embodiments.

FIG. 3 illustrates an example building process 300 for an embeddings model 302 in accordance with one or more embodiments. The example building process 300 may populate model 302 with entries of embeddings (e.g., vectors), (table) field metadata, document keywords in a data store. The example building process 300 may use a pre-trained embeddings model, such as E5, for converting words and/or phrases (i.e., tokens) into vectors. The example building process 300 may use an Ingestion API (e.g., a RESTful Ingestion API) to move (e.g., push) data from an external data source (e.g., document database, log files, and/or the like) to the data store (e.g., via HTTP requests).

From non-tabular data sources, the example building process 300 tokenizes, transforms, and vectorizes documentation into entries in the model 302 as depicted in FIG. 3. Each entry includes one or more representative embeddings for document fragments that are paired with keywords from a corresponding document. These keywords can be compared with keywords of a consolidated question, which allow the model 302 to find and retrieve semantically similar documents.

The example building process 300 extracts data from logs and log reports and then, indexes the extracted data into entries of a semantic search system. Fields in the logs and log reports are identified, extracted, and labeled with a descriptive classification. The labels can be used by the example building process 300 for supervised fine-tuning where the example building process 300 trains the embeddings with labeled data, effectively incorporating human knowledge into the fine-tuning process. The example building process 300 may be configured to map pairings of fields and labels to specific extracted keywords from the documentation. By combining the log field metadata with the document keyword metadata, the system can use the model 302 to perform a lateral search of both tabular and non-tabular data and then, generate answers based on a large corpus of documentation and logs.

4. Example Embodiment

Some embodiments of the chatbot system are implemented for an enterprise system and its users. In these embodiments, the chat mechanism can operate as a conversational agent that can maintain a conversation with the user. The user can await an answer before continuing the conversation with another description and question. The chatbot mechanism enables OCI Log Analytics customers to submit natural language questions and have their questions answered with log data (i.e., structured data), documentation (i.e., unstructured data), or both log data and documentation. When a user provides their natural language question, it can be difficult to determine the user's intent. For this reason, one or more embodiments of the chat mechanism 102 can be configured to distinguish between questions that are more like database queries (e.g., for tabular data) and questions that are more like search terms (e.g., for non-tabular data). Some questions are hybrids and desire answers from both tabular and non-tabular data. Therefore, the chatbot mechanism is conversationally aware and multimodal in operation.

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 4A-4E illustrate multiple question and answer sessions between a user and a chatbot system in accordance with one or more embodiments. In general, the chatbot system can generate, for visualization on the chat interface, an answer to a natural language question that is submitted by the user via a chat interface. As explained throughout this disclosure, the chatbot system may improve its question-answering capabilities with commercially available models and various techniques that when implemented, generate more appropriate responses to the user's natural language question submissions, for example, by classifying a user question according to question type (e.g., a document question, a query question, or a hybrid question). Certain types of user questions indicate specific data sources for finding a suitable answer and/or specific visualizations for presenting the suitable answer and providing such a classification contemporaneous with the user's submission enables the chatbot system to find a suitable answer for that type of question. Further improvement can be achieved by having more informative visualizations (e.g., charts and other content), maintaining a conversation state of a current or accumulated chat history, leveraging an enhanced semantic searching system to build a focused/customized ground truth, coordinating multiple LLMs in a model architecture that avails pre-trained models, and so forth. The user questions may not explicitly indicate the specific data sources and/or specific visualizations for presenting the answer. However, the one or more models may infer the data sources and/or specific visualizations by applying the machine learning and/or semantic analysis techniques previously described.

One or more embodiments of the chatbot system can apply a (fine-tuned) semantic parsing model to classify the natural language question as a document question, a query language question, or a hybrid question. The chatbot system can classify the question as a document question if, for instance, the semantic parsing model predicts that the answer can be found in specific non-tabular data sources. Similarly, the chatbot system can classify the question as a query language question if, for instance, the semantic parsing model predicts that a search of specific tabular data sources can yield an accurate answer. Depending on the classification, the chatbot system generates a suitable response from one or more of a LLM prompt, a structured query, or both.

Figures 4A, 4B:
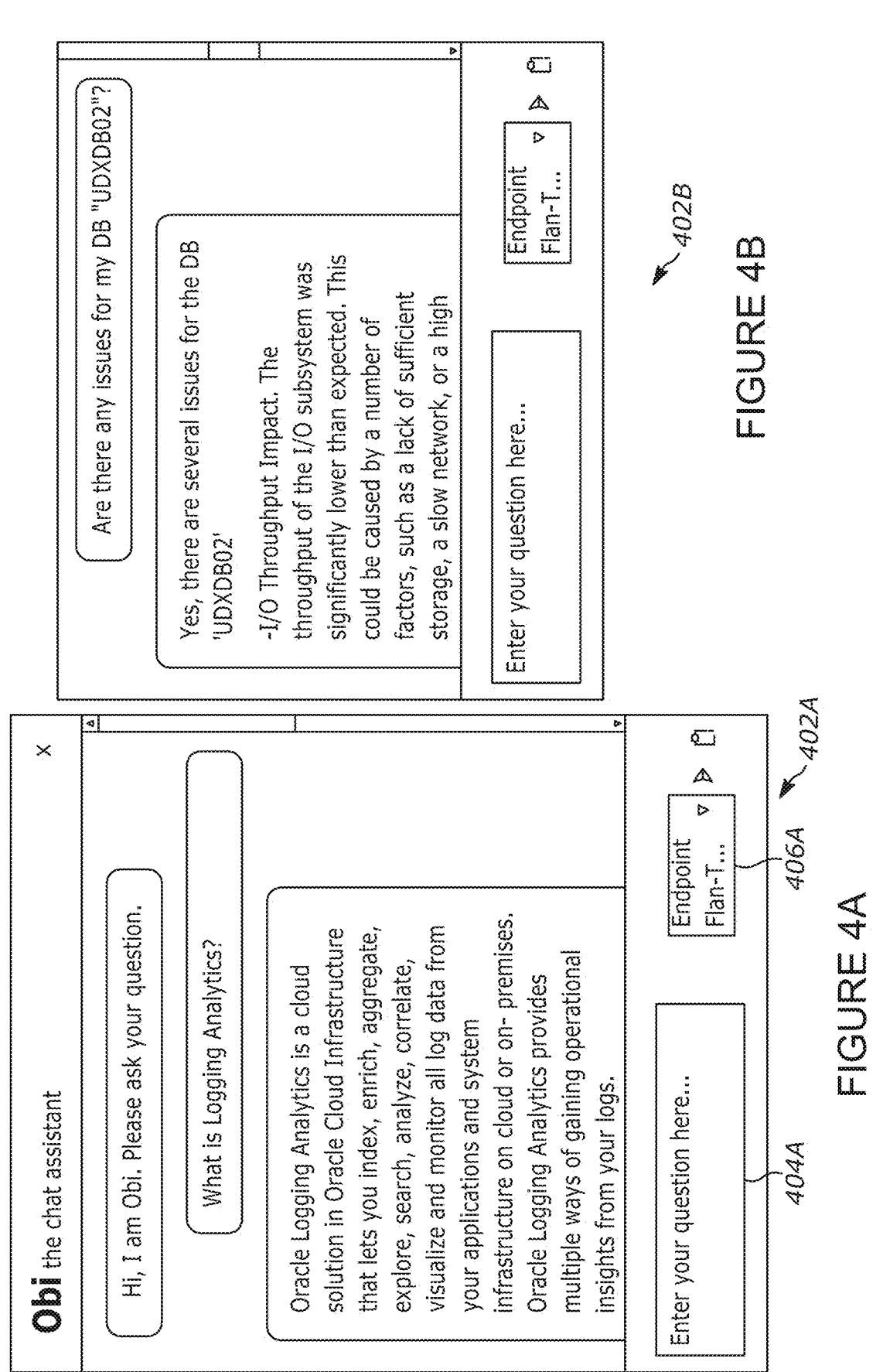

FIG. 4A illustrates a chat interface 402A through which the chatbot system facilitates an example question and answer session. As illustrated, the chat interface 402A includes a user interface control known as a dialog box 404A into which a user inputs a natural language question. The chat interface 402A further includes an LLM selector 406A for specifying a particular model (or model structure) to generate an answer for the natural language question entered into the dialog box 404A. The user may use the LLM selector 406A to scroll through multiple endpoints and/or test different models regarding their question-answering accuracy. In one embodiment, the LLM selector 406A includes different hardware configurations that the user can select for evaluating the particular model. For instance, the user can request that the particular model be evaluated exclusively on CPUs. The user can also select a GPU configuration such that only GPUs evaluate the particular model.

In the example depicted in FIG. 4A, the user has submitted "What is logging analytics?" as a natural language question for the chatbot system to answer. Upon receipt, the chatbot system first determines that the above question is a document question (and not a query language question nor a hybrid question) and then, proceeds to generate an appropriate response using retrieved data from relevant document data sources.

The chatbot system can classify the question "What is logging analytics?" as a document question because the question's own terms indicate a search of non-tabular data sources (e.g., logging analytics documentation) for a suitable answer. In one embodiment, the chatbot system searches the logging analytics documentation for relevant content to use in generating RAG patterns from fragments of the relevant content and ultimately, building a LLM prompt that results in an LLM response having the suitable answer. Some embodiments of the chatbot system construct the LLM prompt with fragments of relevant passages retrieved from the k closest matching semantically similar documents. Some embodiments can also apply the semantic parsing model to determine that the same question "What is logging analytics?" is not a query language question. For these embodiments, none of these data sources are likely to include a suitable answer and the chatbot system can refrain from searching the available tabular data sources for relevant content because, thereby reducing resource consumption and improving the chatbot system's efficiency.

FIG. 4B illustrates a chat interface 402B through which the chatbot system facilitates second example question and answer session. In the example depicted in FIG. 4B, the user submits "Are there any issues for my DB UDXDB02?" as a natural language question for the chatbot system to answer. Upon receipt, the chatbot system first determines that the above question is a document question (and not a query language question nor a hybrid question) based on the application of a semantic parsing model and then, proceeds to generate an appropriate response using retrieved data from relevant document data sources.

One or more embodiments of the chatbot system classifies the question "Are there any issues for my DB UDXDB02?" as a document question because the question's own terms indicate a search of ADDM reports database(s), a non-tabular data source, for a suitable answer. In one embodiment, the chatbot system searches for relevant content to use in generating RAG patterns and building a LLM prompt that combines the above document question with the RAG patterns. One or more embodiments may identify, in an example ADDM report, relevant content in terms of semantic similarity with the above document question such that the chatbot system generates the LLM prompt from fragments of relevant passages retrieved from the k closest matching ADDM reports. Having constructed the LLM prompt from focused ground truth, when the chatbot system instructs the LLM to generate an LLM response, any resulting LLM response most likely includes the suitable answer to the document question.

Some embodiments can also apply the semantic parsing model to determine that the same question "Are there any issues for my DB UDXDB02?" is not a query language question. For these embodiments, none of the available tabular data sources are likely to include a suitable answer and the chatbot system can refrain from searching the available tabular data sources for relevant content because, thereby reducing resource consumption and improving the chatbot system's efficiency.

FIG. 4C illustrates a chat interface 402C through which the chatbot system facilitates a third example question and answer session. In the example depicted in FIG. 4C, the user submits a first natural language question "What is a scheduled task?" for the chatbot system to answer followed up by a second natural language question "How do you create one?", thereby engaging in a conversation. Together, the first and second natural language questions form at least part of a conversation history. Accordingly, these questions follow a conversational style where the second question lacks a conversation state of the first question.

The chatbot system can advantageously use the conversation history to maintain the conversation state for the second question. Leveraging the LLM's text summarization functionality, one or more embodiments of the chatbot system have the LLM summarize the conversation history and consolidate the summarized consolidated conversational history with at least one of the natural language questions being asked. By doing so, the chatbot system rewrites the second or most recent question using one or more previous questions.

Similar to the 1st and 2nd document question and answer sessions, upon receipt of the consolidated question and based on an application of the semantic parsing model, the chatbot system first determines whether that consolidated question is to be classified as a document question, a query language question, or both. Depending on the classification results, the chatbot system proceeds to generate an appropriate response using retrieved data from relevant document data sources and/or a structured query using query language fields of relevant tabular data sources. In the third session, the chatbot system may generate an LLM prompt from the consolidated question and RAG patterns and then, by invoking the LLM, generate an appropriate LLM response having a suitable answer to at least the second or most recent question.

Figure 4D:
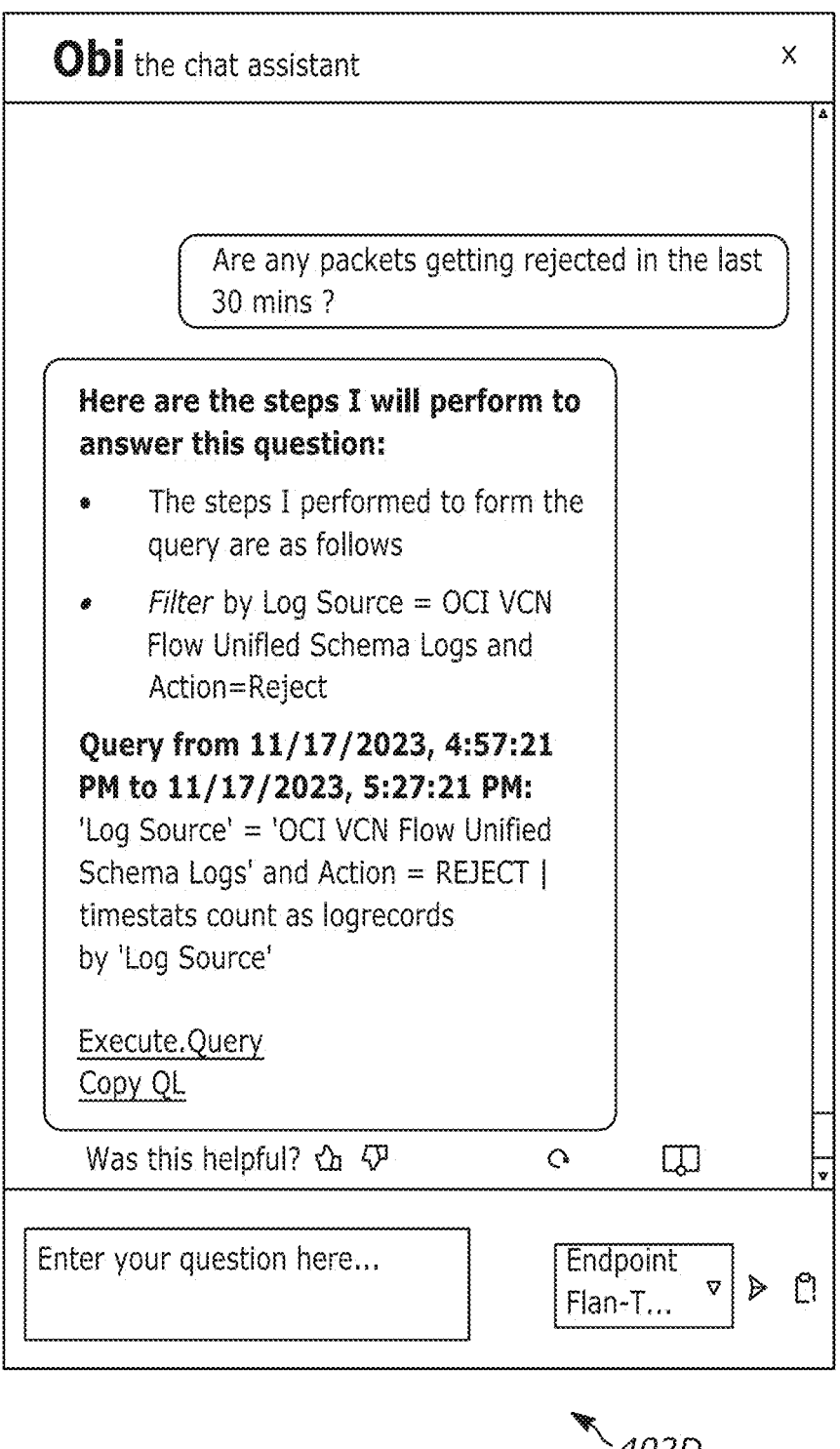

FIG. 4D illustrates a chat interface 402D through which the chatbot system facilitates a fourth example question and answer session. In the example depicted in FIG. 4D, the user submits a natural language question "Are any packets getting rejected in the last 30 minutes?" for the chatbot system to answer. Upon receipt, the chatbot system first determines that the question is a query language question as opposed to a document question or a hybrid question. Similar to the document question and answer sessions depicted in FIGS. 4A through 4C, the chatbot system may rely on an application of the semantic parsing model to determine an appropriate classification for the natural language question. However, unlike the first, second, and third document questions depicted in FIGS. 4A through 4C, the application of the semantic parsing model determines that the question indicates a search of at least one tabular data source (e.g., a log source) and therefore, classifies the question as a query language question.

In response to the above classification, the chatbot system uses at least one model to generate a structured query for answering the query language question. The at least one model (one or all of which may be referred to as a query language generating model) may be arranged into a model architecture. The at least one model may be configured to answer questions that are specific to only tabular data sources but which may or may not be expanded to relevant non-tabular data sources. The at least one model may be configured to answer questions that are based in a grammar of a custom query language. In one embodiment, a fine-tuned T5-based LLM generates a logging analytics query that, when evaluated against one or more log data tables, is configured to answer a question that is specific to a log source.

In one embodiment, the chatbot system invokes a model to predict which tabular data source (e.g., log source) and which (table) fields are needed to construct the structured query. An example of such a model may be a fine-tuned TAPAS LLM. FIG. 4D shows that the query language question indicates a search of a specific log source, VCN flow unified schema logs, for a suitable answer.

In one embodiment, the chatbot system invokes a pre-trained model (e.g., a Bayesian classifier or a commercially available LLM) to detect a time component (e.g., a time range or at least a start time) in the natural language question. In FIG. 4D, an example time component is depicted to be thirty (30) minutes. FIG. 4D also illustrates the option of running the structured query through a query engine for evaluation.

Figure 4E:
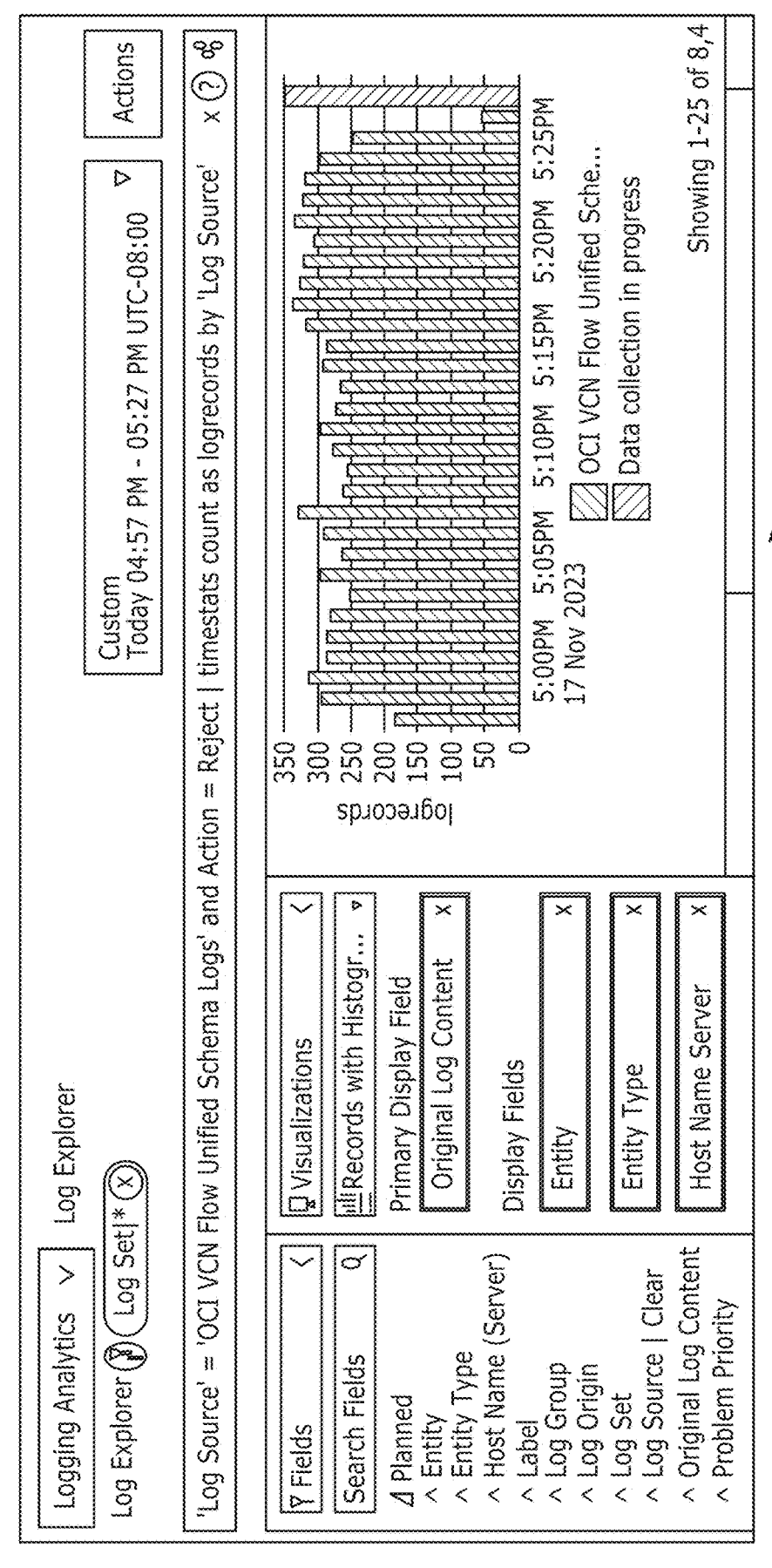

FIG. 4E continues the query execution performed in FIG. 4D. FIG. 4E illustrates an example customizable visualization that is mapped to the execution of the structured query. There are a number of machine learning techniques-some commercially available, others proprietary-capable of creating content for visualizations of structured data (e.g., tabular data). By classifying a user's natural language question as a query language question (or a hybrid question), not only can the chatbot system determine a suitable answer using relevant tabular data but the chatbot system can also identify appropriate ways of visualizing the answer.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

6. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may additionally, or alternatively, provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
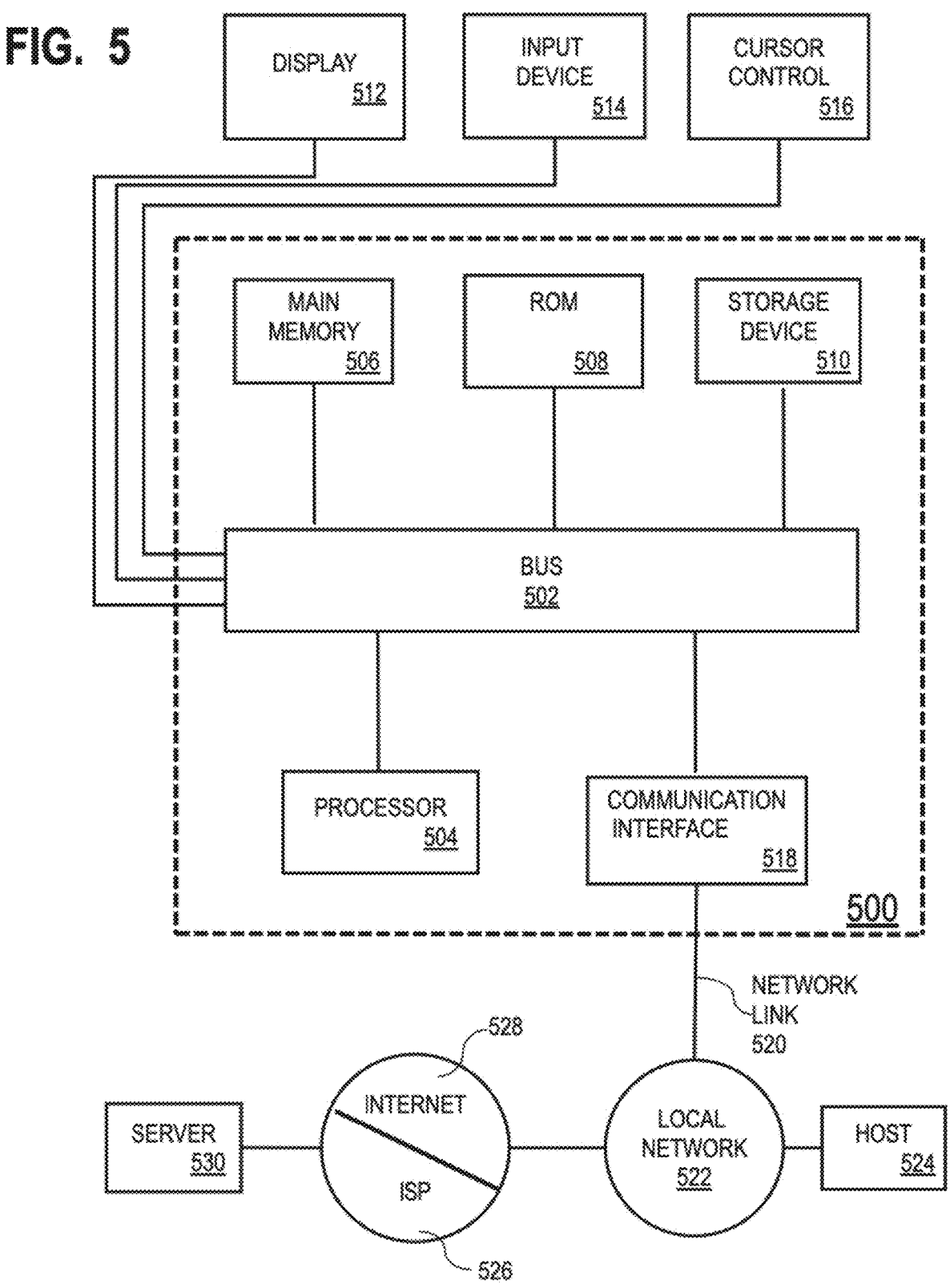
FIG. 5 shows a block diagram that illustrates a computer system in accordance with one or more embodiments.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or a Solid State Drive (SSD) is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

22

What is claimed is:

1. One or more non-transitory computer readable media comprising instructions which, when executed by one or more hardware processors, cause performance of operations comprising:

receiving, by an application or cloud service executing on one or more computing devices, user input provided via a chat interface running on a user device, the user input comprising a natural language question;

based on an application of a semantic parsing model to the natural language question, determining, by the application or cloud service, that the natural language question indicates at least one of a search of non-tabular data sources or a search of tabular data sources;

wherein determining that the natural language question indicates at least one of a search of non-tabular data sources or a search of tabular data sources is distinguished based on a semantic intent associated with the natural language question; and generating, by the application or cloud service, computerized output for visualization on the user interface, the computerized output comprising at least one of:

a large language model (LLM) response to an LLM prompt that comprises retrieved data from the non-tabular data sources based on the natural language question, or a textual representation of a structured data query that is generated from an application of a query language generator model to the natural language question and the tabular data sources.

2. The one or more non-transitory computer readable media of claim 1, the operations further comprising:

determining, by the application or cloud service, a consolidated question configured to maintain a conversation state of the user input.

3. The one or more non-transitory computer readable media of claim 2, wherein determining the consolidated question comprises generating the consolidated question as a combination of the natural language question and a conversation summary that results from an application of the LLM to the user input.

4. The one or more non-transitory computer readable media of claim 1, wherein the semantic parsing model comprises a transformer model for natural language classification.

5. The one or more non-transitory computer readable media of claim 4, wherein the semantic parsing model is fine-tuned for classifying the natural language question as a document question, a log question, or a hybrid question.

6. The one or more non-transitory computer readable media of claim 4, wherein the semantic parsing model comprises a DistilBERT™ model.

7. The one or more non-transitory computer readable media of claim 1, wherein the query language generating model is fine-tuned using field metadata of the tabular data sources.

8. The one or more non-transitory computer readable media of claim 7, wherein the query language generating model is configured to generate logging analytics query language queries.

9. The one or more non-transitory computer readable media of claim 7, wherein the query language generating model is fine-tuned using log field names.

10. The one or more non-transitory computer readable media of claim 7, wherein the query language generating model is fine-tuned using a custom query language.

11. The one or more non-transitory computer readable media of claim 1, wherein determining that the question indicates at least one of a search of non-tabular data sources or a search of tabular data sources further comprises determining that the question maps to at least one of keyword metadata used in the non-tabular data sources or field metadata used in the tabular data sources.

12. The one or more non-transitory computer readable media of claim 1, wherein generating the computerized output further comprises responsive to determining that the question indicates the search of non-tabular data sources, generating the LLM prompt from document fragments having one or more keywords from the natural language question.

13. The one or more non-transitory computer readable media of claim 1, wherein when the question indicates the search of tabular data sources, generating the structured query from field names that also are identified in the natural language question.

14. The one or more non-transitory computer readable media of claim 1, wherein the LLM prompt comprises retrieved data from the non-tabular data sources having a semantic similarity within a threshold of the natural language question.

15. The one or more non-transitory computer readable media of claim 1, wherein the LLM prompt comprises a retrieval augmented generation (RAG) pattern.

16. The one or more non-transitory computer readable media of claim 15, wherein the RAG pattern is retrieved from a data store comprising an entry, comprising document keyword metadata.

17. The one or more non-transitory computer readable media of claim 16, wherein at least one entry comprises log field metadata that maps to the document keyword metadata.

18. The one or more non-transitory computer readable media of claim 16, wherein the data store is populated with a plurality of document vectors from an embeddings model.

19. A method comprising:

receiving, by an application or cloud service executing on one or more computing devices, user input provided via a chat interface running on a user device, the user input comprising a natural language question;

based on an application of a semantic parsing model to the natural language question, determining, by the application or cloud service, that the natural language question indicates at least one of a search of non-tabular data sources or a search of tabular data sources;

wherein determining that the natural language question indicates at least one of a search of non-tabular data sources or a search of tabular data sources is distinguished based on a semantic intent associated with the natural language question;

generating, by the application or cloud service, computerized output for visualization on the user interface, the computerized output comprising at least one of:

a large language model (LLM) response to an LLM prompt that comprises retrieved data from the non-tabular data sources, or a textual representation of a structured data query that is generated from an application of a query language generator model to the natural language question and the tabular data sources; and wherein the method is performed by at least one device including a hardware processor.

20. A system comprising:

at least one device including a hardware processor; and the system being configured to perform operations comprising:

receiving, by an application or cloud service executing on one or more computing devices, user input provided via a chat interface running on a user device the user input comprising a natural language question;

based on an application of a semantic parsing model to the natural language question, determining, by the application or cloud service executing on one or more computing devices, that the natural language question indicates at least one of a search of non-tabular data sources or a search of tabular data sources;

wherein determining that the natural language question indicates at least one of a search of non-tabular data sources or a search of tabular data sources is distinguished based on a semantic intent associated with the natural language question; and generating, by the application or cloud service executing on one or more computing devices, computerized output for visualization on the user interface, the computerized output comprising at least one of:

a large language model (LLM) response to an LLM prompt that comprises retrieved data from the non-tabular data sources, or a textual representation of a structured data query that is generated from an application of a query language generator model to the natural language question and the tabular data sources.

* * * * *